United States Patent
Izumisawa et al.

(10) Patent No.: US 11,489,977 B1
(45) Date of Patent: Nov. 1, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Yusuke Izumisawa, Kanagawa (JP); Toshihiro Iwafuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/463,633

(22) Filed: Sep. 1, 2021

(30) Foreign Application Priority Data

May 20, 2021 (JP) .............................. JP2021-085218

(51) Int. Cl.
*H04N 1/60* (2006.01)
*H04N 1/00* (2006.01)
*G06F 3/0482* (2013.01)

(52) U.S. Cl.
CPC ....... *H04N 1/00413* (2013.01); *G06F 3/0482* (2013.01); *H04N 1/603* (2013.01); *H04N 1/6027* (2013.01)

(58) Field of Classification Search
CPC . H04N 1/00413; H04N 1/6027; G06F 3/0482
See application file for complete search history.

(56) References Cited

U.S. PATENT DOCUMENTS

| | | | | |
|---|---|---|---|---|
| 2008/0112025 | A1* | 5/2008 | Kishimoto | H04N 1/6058 358/518 |
| 2010/0123942 | A1* | 5/2010 | Fowler | H04N 1/603 358/518 |
| 2014/0210842 | A1* | 7/2014 | Yamazaki | H04N 17/04 345/589 |
| 2015/0332132 | A1* | 11/2015 | Inamura | H04N 1/6058 358/1.9 |
| 2016/0360072 | A1* | 12/2016 | Inamura | H04N 1/6041 |
| 2018/0352116 | A1* | 12/2018 | Fukasawa | H04N 1/6052 |
| 2019/0139511 | A1* | 5/2019 | Yamashita | G06F 3/1282 |
| 2019/0301941 | A1* | 10/2019 | Kawabata | G01J 3/52 |
| 2022/0012554 | A1* | 1/2022 | Nakajima | H04N 1/6058 |

FOREIGN PATENT DOCUMENTS

| | | | |
|---|---|---|---|
| JP | 2015-119371 A | 6/2015 | |
| JP | 2020182104 A | * 11/2020 | ............ B41J 29/393 |

* cited by examiner

*Primary Examiner* — Ted W Barnes
(74) *Attorney, Agent, or Firm* — Oliff PLC (57) ABSTRACT

An information processing apparatus includes a processor configured to: receivably display, as options, plural generation conditions each with a different balance among plural effects including gradation and color reproducibility, the plural generation conditions each being a condition for generating a color conversion profile with values in a device-independent color system as input and values of colors in a device-dependent color system including a spot color as output; and generate a color conversion profile based on a generation condition received as an option.

8 Claims, 5 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-085218 filed May 20, 2021.

BACKGROUND

(i) Technical Field

The present disclosure relates to an information processing apparatus and a non-transitory computer readable medium.

(ii) Related Art

Japanese Unexamined Patent Application Publication No. 2015-119371 describes a color profile generating system including the following: a profile generation condition input unit with which a user inputs a profile generation condition; a profile generation algorithm determining unit that determines a color matching and color separation profile generation algorithm based on the profile generation condition; an evaluation item determining unit that determines an evaluation item for evaluating accuracy of a color matching and color separation profile based on the profile generation condition; an evaluation threshold determining unit that determines an evaluation threshold for evaluating accuracy of a color matching and color separation profile based on the profile generation condition; a profile generating unit that generates a color matching and color separation profile based on the determined profile generation algorithm; and a profile evaluation unit that evaluates the color matching and color separation profile using the determined evaluation item and the determined evaluation threshold.

Technology for displaying color conversion profile generation conditions on a user interface and receiving selection is available. In this technology, the selection of whether to emphasize gradation as a color conversion profile generation condition is received.

However, the balance between color reproducibility and gradation may not be received as an option. In particular, if the colors of the color conversion profile include a spot color, because the accuracy of the spot-color color conversion profile is low, the balance between gradation and color reproducibility may be important.

SUMMARY

Aspects of non-limiting embodiments of the present disclosure relate to providing an information processing apparatus and a non-transitory computer readable medium storing a program for allowing a user to select the balance among a plurality of effects including gradation and color reproducibility as a condition for generating a color conversion profile including a spot color.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receivably display, as options, a plurality of generation conditions each with a different balance among a plurality of effects including gradation and color reproducibility, the plurality of generation conditions each being a condition for generating a color conversion profile with values in a device-independent color system as input and values of colors in a device-dependent color system including a spot color as output; and generate a color conversion profile based on a generation condition received as an option.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described with reference to the drawings. Note that the same or equivalent elements and parts in the drawings are given the same reference numeral. In addition, the dimensional ratios in the drawings are exaggerated for convenience of description, and may differ from the actual ratios.

First Exemplary Embodiment

Figure 1:
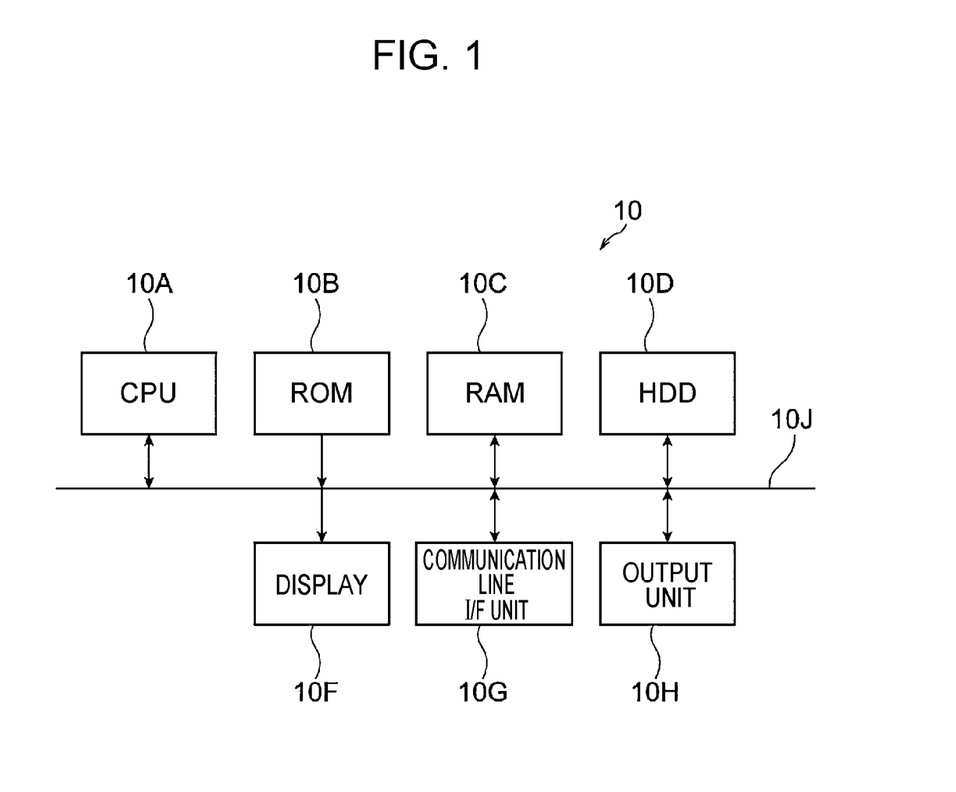
FIG. 1 is a block diagram illustrating the hardware configuration of an image forming apparatus according to a first exemplary embodiment.

FIG. 1 is a block diagram illustrating the hardware configuration of an image forming apparatus serving as an information processing apparatus according to a first exemplary embodiment.

An image forming apparatus 10 is an apparatus that forms an image on a recording medium such as paper on the basis of a print job. The image forming apparatus 10 may be any apparatus, such as a printer or a multifunctional peripheral.

The image forming apparatus 10 according to the present exemplary embodiment includes a central processing unit (CPU) 10A, which serves as an example of a processor, a read-only memory (ROM) 10B, a random-access memory (RAM) 10C, a hard disk drive (HDD) 10D, a display 10F, a communication interface (I/F) unit 10G, and an output unit 10H.

The CPU 10A controls the overall operation of the image forming apparatus 10. The ROM 10B stores in advance various control programs and various parameters. The RAM 10C is used as a work area for the CPU 10A when the CPU 10A executes various programs. The HDD 10D stores various types of data and application programs. A touchscreen display is applied as the display 10F, which is used for inputting various types of information and displaying various types of information.

The communication I/F unit 10G is connected to a communication line (not illustrated), and transmits/receives various types of data to/from another apparatus connected to the communication line.

The output unit 10H forms an image on a recording medium such as paper using ink or toner of each color of cyan, magenta, yellow, black (CMYK) and one or more spot colors (such as fluorescent pink) on the basis of a print job.

These units of the above image forming apparatus 10 are electrically connected to one another by a system bus 10J. Although the HDD 10D is applied as a memory in the image forming apparatus 10 according to the present exemplary embodiment, this is not the only possible application; for example, another non-volatile memory such as flash memory is also applicable.

With the above configuration, the image forming apparatus 10 according to the present exemplary embodiment executes the following by using the CPU 10A: accessing the ROM 10B, RAM 10C, and HDD 10D; obtaining various types of data via the display 10F; and displaying various types of information on the display 10F. In addition, the image forming apparatus 10 executes, by using the CPU 10A, control of transmission/reception of communication data via the communication I/F unit 10G. For example, the image forming apparatus 10 receives image data via the communication I/F unit 10G from an information processing terminal realized by a personal computer (PC) or the like.

In the image forming apparatus 10 according to the present exemplary embodiment, the CPU 10A executes a program stored in advance in the ROM 10B or the HDD 10D, thereby performing a process of generating a color conversion profile with values in a device-independent color system as input and values in a device-dependent color system as output.

Figure 2:
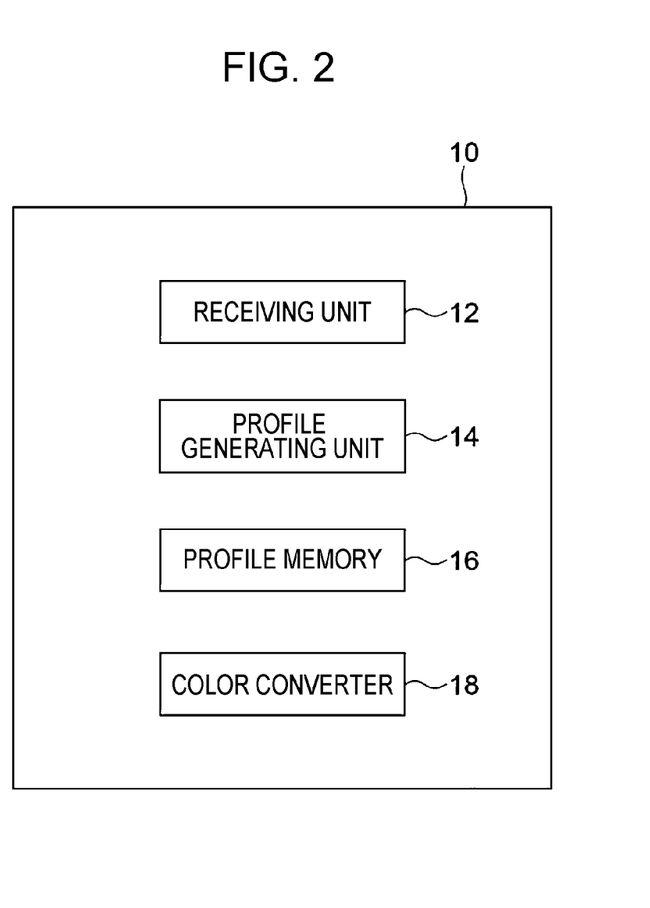
FIG. 2 is a functional block diagram of the image forming apparatus according to the first exemplary embodiment.

Next, the functional configuration of the image forming apparatus 10 according to the present exemplary embodiment configured as above will be described. FIG. 2 is a functional block diagram of the image forming apparatus 10 according to the present exemplary embodiment. Note that each functional unit is realized by executing, by the CPU 10A, a program stored in advance in the ROM 10B or the HDD 10D.

The image forming apparatus 10 has the functions of a receiving unit 12, a profile generating unit 14, a profile memory 16, and a color converter 18.

Figure 3:
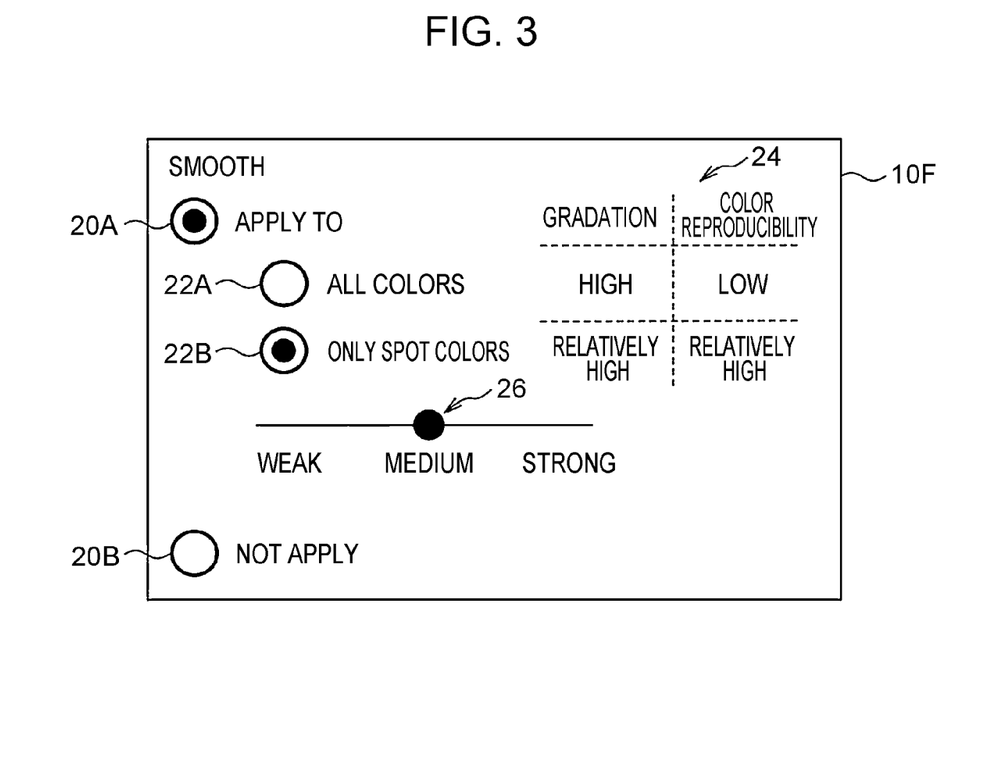
FIG. 3 is a diagram illustrating a display example of a display of the image forming apparatus according to the first exemplary embodiment.

The receiving unit 12 displays a selection screen for selecting a color conversion profile generation condition(s) on the display 10F. On this selection screen, as illustrated in FIG. 3, the following are arranged: options 20A and 20B for selecting whether to perform smoothing of a color conversion profile; options 22A and 22B for selecting whether to perform smoothing on all colors or only on spot colors in a device-dependent color system (such as CMYK and spot colors); a balance display area 24 displaying the balance between gradation and color reproducibility for the options 22A and 22B; and a slider bar 26 for selecting the strength of smoothing. FIG. 3 illustrates the example where, in the case of performing smoothing on all colors in the device-dependent color system, it is displayed that, although gradation will be high, color reproducibility will be low; and in the case of performing smoothing only on spot colors in the device-dependent color system, it is displayed that gradation will be relatively high, and color reproducibility will be relatively high. FIG. 3 also illustrates the example where the option 20A for selecting to perform smoothing of a color conversion profile and the option 22B for selecting to perform smoothing only on spot colors in the device-dependent color system are selected, and, with the slider bar 26, the medium strength is selected as the strength of smoothing.

The profile generating unit 14 generates, in accordance with the selected generation conditions, a color conversion profile with values in a device-independent color system as input and the values of each color in a second device-dependent color system (such as CMYK and spot color) including a spot color (fluorescent pink) as output.

Specifically, the profile generating unit 14 regards each of values in a device-independent color system (such as the L*a*b space) corresponding to values in a first device-dependent color system (such as red, green, and blue (RGB)) at each of grid points in an input color gamut of the information processing terminal as a value in the target device-independent color system.

In the case where it is selected, as a generation condition, to perform smoothing only on spot colors, the profile generating unit 14 performs processing in the following manner.

At first, the profile generating unit 14 calculates, for each of the values in the target device-independent color system, the values of the spot color in the second device-dependent color system. On the basis of the calculation results of the values of the spot color, the profile generating unit 14 generates a spot-color-version color conversion profile with the values in the device-independent color system as input and the values of the spot color in the second device-dependent color system as output. The profile generating unit 14 changes the values of the spot color in the second device-dependent color system so as to smooth changes in the values of the spot color in response to changes in the values in the device-independent color system. The profile generating unit 14 calculates, for each of the values in the target device-independent color system, the values of CMYK in the second device-dependent color system. The profile generating unit 14 generates, on the basis of the calculation results of the values of the spot color after the change and the values of CMYK, spot-color-version and CMYK-version color conversion profiles with the values in the device-independent color system as input and the values of the spot color after the change and the values of CMYK in the second device-dependent color system as output.

In the case where it is selected, as a generation condition, to perform smoothing on all colors, the profile generating unit 14 performs processing in the following manner.

At first, the profile generating unit 14 calculates, for each of the values in the target device-independent color system, the values of CMYK and the spot color in the second device-dependent color system. The profile generating unit 14 generates, on the basis of the calculation results of the values of CMYK and the spot color, spot-color-version and CMYK-version color conversion profiles with the values in the device-independent color system as input and the values of CMYK and the spot color in the second device-dependent color system as output. The profile generating unit 14 changes the values of CMYK and the spot color in the spot-color-version and CMYK-version color conversion profiles so as to smooth changes in the values of CMYK and the spot color in the second device-dependent color system in response to changes in the values in the device-independent color system.

In the case where it is selected, as a generation condition, to not perform smoothing, the profile generating unit 14 performs processing in the following manner.

At first, the profile generating unit 14 calculates, for each of the values in the target device-independent color system, the values of CMYK and the spot color in the second device-dependent color system. The profile generating unit 14 generates, on the basis of the calculation results of the values of CMYK and the spot color, spot-color-version and CMYK-version color conversion profiles with the values in the device-independent color system as input and the values of CMYK and the spot color in the second device-dependent color system as output.

The profile memory 16 stores the generated spot-color-version and CMYK-version color conversion profiles.

Using the spot-color-version and CMYK-version color conversion profiles, the color converter 18 performs color conversion processing of image data received from the information processing terminal to generate a print job represented by CMYK and spot color data, and outputs the print job to the output unit 10H.

Figure 4:
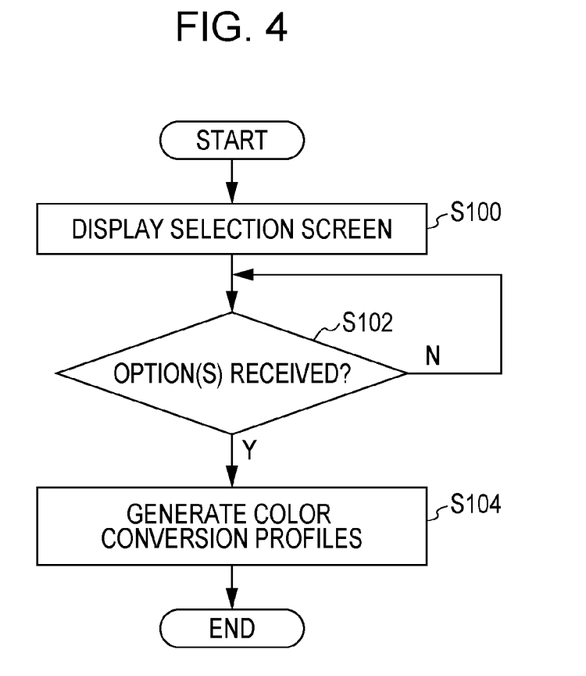
FIG. 4 is a flowchart illustrating an example of the flow of a specific process performed by the image forming apparatus according to the first exemplary embodiment.

Next, a process performed by the image forming apparatus 10 according to the first exemplary embodiment configured as above will be described. FIG. 4 is a flowchart illustrating an example of the flow of a specific process performed by the image forming apparatus 10 according to the present exemplary embodiment. Note that the process illustrated in FIG. 4 starts in response to the issuing of a color conversion profile generation command by the image forming apparatus 10.

In step S100, the receiving unit 12 displays a selection screen for selecting a color conversion profile generation condition(s) on the display 10F.

In step S102, the receiving unit 12 determines whether the selection of a generation condition option(s) has been received on the selection screen in response to a user operation. In the case where the receiving unit 12 determines that the selection of a generation condition option(s) has been received on the selection screen in response to a user operation, the process proceeds to step S104.

In step S104, the profile generating unit 14 generates, in accordance with the selected generation condition(s), a color conversion profile with the values in the device-independent color system as input and the values of each color in the second device-dependent color system as output.

The generated spot-color-version and CMYK-version color conversion profiles are stored in the profile memory 16, and the process ends.

As described above, when generating a color conversion profile that outputs values in a device-dependent color system including a spot color from values in a device-independent color system, a plurality of color conversion profile generation conditions each with a different balance among a plurality of effects including gradation and color reproducibility are selectably displayed as options, thereby allowing the user to select the balance among the plurality of effects including gradation and color reproducibility.

Since the accuracy of generating a spot-color color conversion profile is low, the user may select the balance between gradation and color reproducibility in accordance with the selection of colors to be smoothed in the color conversion profile.

Although the above-described exemplary embodiment has been described using an exemplary case in which the balance between gradation and color reproducibility when performing smoothing is displayed in the balance display area 24 on the display, this is not the only possible case, and the balance between gradation and color reproducibility when not performing smoothing may be displayed. In this case, it is only necessary to display that, although gradation will be low, color reproducibility will be high.

Second Exemplary Embodiment

Next, an image forming apparatus according to a second exemplary embodiment will be described. Because the image forming apparatus according to the second exemplary embodiment has the same configuration as that of the first embodiment, a description thereof is omitted by using the same reference numerals.

In the second exemplary embodiment, the point that there are plural spot colors in the device-dependent color system, and the point that the combination of spot colors and K is included as an option of to-be-smoothed colors, which serves as a generation condition, are different from the first exemplary embodiment.

Figure 5:
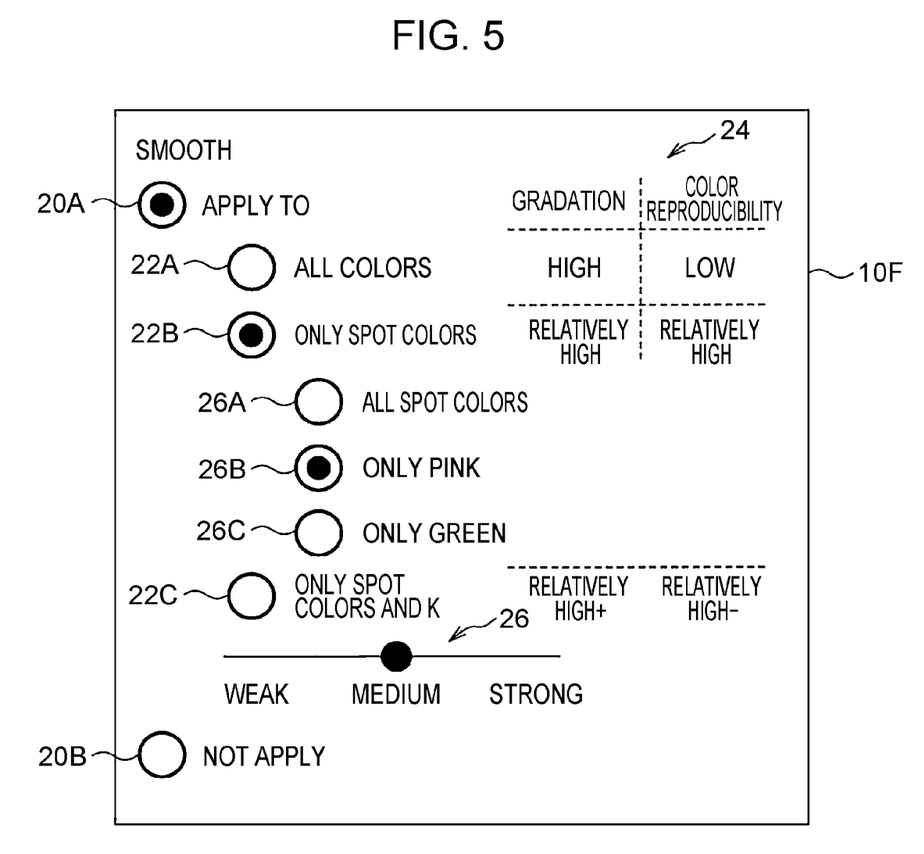
FIG. 5 is a diagram illustrating a display example of a display of an image forming apparatus according to a second exemplary embodiment.

The receiving unit 12 of the image forming apparatus 10 of the second exemplary embodiment displays a selection screen for selecting a color conversion profile generation condition(s) on the display 10F. On this selection screen, as illustrated in FIG. 5, the following are arranged: options 20A and 20B for selecting whether to perform smoothing of a color conversion profile; options 22A, 22B, and 22C for selecting whether to perform smoothing on all colors, only on spot colors, or only on spot colors and K in a device-dependent color system (such as CMYK and spot colors (fluorescent pink and green)); options 26A, 26B, and 26C for selecting, in the case of performing smoothing only on spot colors, whether to perform smoothing on all the spot colors, only on fluorescent pink, or only on green; a balance display area 24 displaying the balance between gradation and color reproducibility for the options 22A, 22B, and 22C; and a slider bar 26. FIG. 5 illustrates the example where, in the case of performing smoothing on all colors in the device-dependent color system, it is displayed that, although gradation will be high, color reproducibility will be low; in the case of performing smoothing only on spot colors in the device-dependent color system, it is displayed that gradation will be relatively high, and color reproducibility will be relatively high; and in the case of performing smoothing only on spot colors and K in the device-dependent color system, it is displayed that gradation will be relatively high, and color reproducibility will be relatively high. FIG. 5 also illustrates the example where, in the case where smoothing is performed only on spot colors in the device-dependent color system and in the case where smoothing is performed only on spot colors and K in the device-dependent color system, it is displayed that gradation will be high and color reproducibility will be low in the case where smoothing is performed only on spot colors and K in the device-dependent color system.

FIG. 5 described above also illustrates the example where the option 20A for selecting to perform smoothing of a color conversion profile, the option 22B for selecting to perform smoothing only on spot colors in the device-dependent color system, the option 26B for selecting to perform smoothing only on fluorescent pink are selected, and, with the slider bar 26, the medium strength is selected as the strength of smoothing.

The profile generating unit 14 generates, in accordance with the selected generation condition(s), a color conversion profile with the values in the device-independent color system as input and the values of each color in the second device-dependent color system including spot colors (fluorescent pink and green) as output.

Specifically, the profile generating unit 14 regards each of the values in the device-independent color system corresponding to the values in the first device-dependent color system at each of grid points in the input color gamut of the information processing terminal as a value in the target device-independent color system.

In the case where it is selected, as a generation condition, to perform smoothing only on all the spot colors, the profile generating unit 14 performs processing in the following manner.

At first, the profile generating unit 14 calculates, for each of the values in the target device-independent color system, the values of all the spot colors (fluorescent pink and green) in the second device-dependent color system. The profile generating unit 14 changes the values of fluorescent pink in the second device-dependent color system so as to smooth changes in the values of fluorescent pink in response to changes in the values in the device-independent color system. The profile generating unit 14 changes the values of green in the second device-dependent color system so as to smooth changes in the values of green in response to changes in the values in the device-independent color system. The profile generating unit 14 calculates, for each of the values in the target device-independent color system, the values of CMYK in the second device-dependent color system on the basis of the values of fluorescent pink after the change and the values of green after the change. The profile generating unit 14 generates, on the basis of the calculation results of the values of fluorescent pink after the change, the values of green after the change, and the values of CMYK, fluorescent-pink-version, green-version, and CMYK-version color conversion profiles with the values in the device-independent color system as input and the values of fluorescent pink after the change, the values of green after the change, and the values of CMYK in the second device-dependent color system as output.

In the case where it is selected, as a generation condition, to perform smoothing only on fluorescent pink among the spot colors, the profile generating unit 14 performs processing in the following manner.

At first, the profile generating unit 14 calculates, for each of the values in the target device-independent color system, the values of fluorescent pink in the second device-dependent color system. The profile generating unit 14 changes the values of fluorescent pink in the second device-dependent color system so as to smooth changes in the values of fluorescent pink in response to changes in the values in the device-independent color system. The profile generating unit 14 calculates, for each of the values in the target device-independent color system, the values of green and CMYK in the second device-dependent color system on the basis of the values of fluorescent pink after the change. The profile generating unit 14 generates, on the basis of the calculation results of the values of fluorescent pink after the change, the values of green, and the values of CMYK, fluorescent-pink-version, green-version, and CMYK-version color conversion profiles with the values in the device-independent color system as input and the values of fluorescent pink after the change, the values of green, and the values of CMYK in the second device-dependent color system as output.

In the case where it is selected, as a generation condition, to perform smoothing only on green among the spot colors, like the case where it is selected to perform smoothing only on fluorescent pink, the profile generating unit 14 generates a color conversion profile so as to perform smoothing only on green.

In the case where it is selected, as a generation condition, to perform smoothing only on spot colors and K, the profile generating unit 14 performs processing in the following manner.

At first, the profile generating unit 14 calculates, for each of the values in the target device-independent color system, the values of all the spot colors in the second device-dependent color system. The profile generating unit 14 changes the values of fluorescent pink in the second device-dependent color system so as to smooth changes in the values of fluorescent pink in response to changes in the values in the device-independent color system. The profile generating unit 14 changes the values of green in the second device-dependent color system so as to smooth changes in the values of green in response to changes in the values in the device-independent color system. The profile generating unit 14 calculates, for each of the values in the target device-independent color system, the values of K in the second device-dependent color system on the basis of the values of fluorescent pink after the change and the values of green after the change. The profile generating unit 14 changes the values of K in the second device-dependent color system so as to smooth changes in the values of K in response to changes in the values in the device-independent color system. For each of the values in the target device-independent color system, the profile generating unit 14 calculates the values of CMY in the second device-dependent color system on the basis of the calculation results of the values of fluorescent pink after the change, the values of green after the change, and the values of K after the change. The profile generating unit 14 generates, on the basis of the calculation results of the values of fluorescent pink after the change, the values of green after the change, and the values of K after the change, fluorescent-pink-version, green-version, K-version, and CMY-version color conversion profiles with the values in the device-independent color system as input and the values of fluorescent pink after the change, the values of green after the change, the values of K after the change, and the values of CMY in the second device-dependent color system as output.

In the case where it is selected, as a generation condition, to perform smoothing on all colors, the profile generating unit 14 generates, using the method described in the above-described first exemplary embodiment, color conversion profiles so as to perform smoothing on all the colors in the second device-dependent color system.

In the case where it is selected, as a generation condition, to not perform smoothing, the profile generating unit 14 generates, using the method described in the above-described first exemplary embodiment, color conversion profiles without performing smoothing.

Because the other configuration and operation of the image forming apparatus 10 according to the second exemplary embodiment are the same as or similar to those of the first exemplary embodiment, descriptions thereof are omitted.

As described above, when generating a color conversion profile that outputs values in a device-dependent color system including a plurality of spot colors from values in a device-independent color system, a plurality of color conversion profile generation conditions each with a different balance among a plurality of effects including gradation and color reproducibility are selectably displayed as options, thereby allowing the user to select the balance among the plurality of effects including gradation and color reproducibility.

Although the exemplary case in which the device-independent color system is the L*a*b* space has been described in the above-described first and second exemplary embodiments, this is not the only possible case, and the device-independent color system may be other color spaces.

Although the exemplary case in which the second device-dependent color system includes spot colors and CMYK has been described, this is not the only possible case, and colors other than spot colors may be colors other than CMYK. Although spot colors include fluorescent pink and green in the present exemplary embodiments, they are not the only possible spot colors, and spot colors may include, for example, violet and orange.

Although the exemplary case of applying the present disclosure to the image forming apparatus has been described, this is not the only possible case. The present disclosure is applicable to information processing apparatuses such as smartphones and computers.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, a process performed by the image forming apparatus 10 according to the above-described exemplary embodiments may be a process performed by software, a process performed by hardware, or a process combining the two. In addition, a process performed by the image forming apparatus 10 may be stored as a program in a storage medium for distribution.

The present disclosure is not limited to the above, and needless to say, may be implemented by adding, in addition to the above, various modifications within a range not deviating from the gist thereof.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
 a processor configured to:
  receivably display, as options, a plurality of generation conditions each with a different balance among a plurality of effects including gradation and color reproducibility, the plurality of generation conditions each being a condition for generating a color conversion profile with values in a device-independent color system as input and values of colors in a device-dependent color system including a spot color as output; and
  generate a color conversion profile based on a generation condition received as an option.

2. The information processing apparatus according to claim 1, wherein the processor is configured to receivably display, as a generation condition option, a color in the device-dependent color system to be changed so as to smooth changes in values of the color in response to changes in the values in the device-independent color system in the color conversion profile.

3. The information processing apparatus according to claim 2, wherein the processor is configured to display, along with the options, information indicating balance among the plurality of effects under the generation conditions.

4. The information processing apparatus according to claim 2, wherein the processor is further configured to selectably display strength of the smoothing.

5. The information processing apparatus according to claim 2, wherein:
 the processor is configured to:
  for each of the values in the target device-independent color system, calculate values of a selected color in the device-dependent color system;
  change the values of the selected color in the device-dependent color system so as to smooth changes in the values of the selected color in the device-dependent color system in response to changes in the values in the device-independent color system; and
  for each of the values in the target device-independent color system, based on the values of the selected color in the device-dependent color system after the change, calculate values of remaining colors in the device-dependent color system, and generate a color-conversion profile with the values in the device-independent color system as input and the values of the selected color in the device-dependent color system after the change and the values of the remaining colors in the device-dependent color system as output.

6. The information processing apparatus according to claim 1, wherein the processor is configured to display, along with the options, information indicating balance among the plurality of effects under the generation conditions.

7. A non-transitory computer readable medium storing a program causing a computer to execute a process, the process comprising:
 receivably displaying, as options, a plurality of generation conditions each with a different balance among a plurality of effects including gradation and color reproducibility, the plurality of generation conditions each being a condition for generating a color conversion profile with values in a device-independent color system as input and values of colors in a device-dependent color system including a spot color as output; and
 generating the color conversion profile based on a generation condition received as an option.

8. An information processing apparatus comprising:
 means for receivably displaying, as options, a plurality of generation conditions each with a different balance among a plurality of effects including gradation and color reproducibility, the plurality of generation conditions each being a condition for generating a color conversion profile with values in a device-independent color system as input and values of colors in a device-dependent color system including a spot color as output, and means for generating the color conversion profile based on a generation condition received as an option.

* * * * *